United States Patent [19]

Ohmi et al.

[11] 4,298,320
[45] Nov. 3, 1981

[54] APPARATUS FOR DISPENSING AND MOLDING LINING MATERIAL INTO METALLIC CAP SHELLS

[75] Inventors: Hidehiko Ohmi, Hiratsuka; Kazuhisa Ishibashi, Tokyo, both of Japan

[73] Assignee: Toyo Seikan Kaisha, Ltd., Tokyo, Japan

[21] Appl. No.: 153,955

[22] Filed: May 28, 1980

[30] Foreign Application Priority Data

Jun. 6, 1979 [JP] Japan .................................. 54-69929

[51] Int. Cl.³ ........................ B29D 31/00; B29C 13/02
[52] U.S. Cl. .................................... 425/110; 264/268; 425/113; 425/174.8 R; 425/809
[58] Field of Search ............... 425/126 R, 174.8 R, 425/809, 110, 113; 264/268

[56] References Cited

U.S. PATENT DOCUMENTS

| 2,445,742 | 7/1948 | Hoch | 425/174.8 |
| 2,881,475 | 4/1959 | Wilckens | 425/809 |
| 2,999,531 | 9/1961 | Acton | 425/809 |
| 3,462,331 | 8/1969 | Simons | 264/268 |

FOREIGN PATENT DOCUMENTS

1196126  6/1970  United Kingdom ................ 264/268

*Primary Examiner*—James B. Lowe
*Attorney, Agent, or Firm*—Pennie & Edmonds

[57] ABSTRACT

An apparatus for dispensing and molding lining material into metallic cap shells. The apparatus has a conveyor mechanism for conveying shells from a shell supply station to a lining material dispensing station and then on to a shell transfer station including a molding mechanism for molding lining material in the shells. An induction heater heats the shells moving from the supply station to the lining material dispensing station and from the dispensing station to the shell transfer station.

3 Claims, 5 Drawing Figures

APPARATUS FOR DISPENSING AND MOLDING LINING MATERIAL INTO METALLIC CAP SHELLS

FIELD OF THE INVENTION

The invention relates to an apparatus for dispensing and molding a lining material into metallic cap shells.

BACKGROUND OF THE INVENTION

Container closure caps now in widespread commercial use are constructed of metallic cap shells made of a suitable metal plate such as a tin plate, a tin-free steel sheet or an aluminum-base alloy sheet. A liner of a suitable plastic material such as a polyolefin resin (e.g. polyethylene or polypropylene) or a vinyl chloride resin is applied to the top panel of the caps at their inner surfaces.

The lining material is applied to the inner surface of the top panel of a metallic cap shell by apparatus which comprises a conveyor mechanism for conveying cap shells at a predetermined speed through a predetermined passage from a cap shell supply station to a cap shell transfer station through a lining material dispensing station. The apparatus also comprises a supply mechanism for supplying cap shells to the conveyor mechanism at the shell supply position, a heater disposed along the conveying passage between the shell supply station and the lining material dispensing station, a lining material dispensing mechanism for dispensing a predetermined amount of lining material into the cap shells at the lining material dispensing station, and a molding mechanism for receiving the cap shells from the conveyor mechanism at the shell transfer station and molding the lining material in the cap shells into a predetermined shape. Such an apparatus is described, for example, in the specifications and drawings of Japanese Patent Publication No. 20759/67, Japanese Laid-Open Patent Publication No. 99186/77 and Japanese Patent Application No. 82888/78.

A cap shell (especially its top panel) is heated in such an apparatus to a predetermined temperature by the heater, and thereafter, a lining material is dispensed into the heated cap shell and molded therein. Generally, the inside surface of the cap shell is coated with an adhesive primer composed, for example, of an epoxy-phenol type paint and oxidized polyethylene or maleinized polyethylene dispersed therein. Thus, when the cap shell is heated by the heater, the adhesive primer layer is also heated. Since the lining material is molded while the adhesive primer layer is at a high temperature, the molded lining material is bonded to the inner surface of the top panel of the cap shell by the adhesive primer.

Extensive investigations and experiments concerning the bond strength between the cap shell and the lining material as a function of heating of the cap shell have led to the discovery of certain facts. In the prior art apparatus described above, the cap shell is heated only between the cap shell supply station and the lining material dispensing station, and therefore, the cap shell is not heated at a position downstream of the lining material dispensing station. However, to mold the lining material dispensed into the cap shell, it is necessary to transfer the cap shell containing the dispensed lining material to the molding mechanism. Because of the nature of the structure of the mechanism for moving the cap shell, it is necessary to transfer the cap shell from the lining material dispensing station to the molding station through a passage of a predetermined length. It has been found in the aforementioned apparatus that when the cap shell is composed of a metallic material having high thermal conductivity such as an aluminum base alloy, the temperature of the cap shell decreases considerably due to heat dissipation during movement of the shell from the lining material dispensing station to the molding mechanism. Consequently, the temperature drop tends to reduce the bond strength between the cap shell and the molded lining material. If an attempt is made to prevent temperature drop by heating the cap shell to a sufficiently high temperature before it reaches the lining material dispensing station, then it is necessary to heat the cap shell rapidly during its travel from the shell supply station to the lining material dispensing station. However, it is extremely difficult to heat the top panel of the cap shell uniformly by rapid heating, and as a result, the temperature distribution of the top panel of the shell becoms non-uniform. In particular, in an apparatus where cap shells are conveyed at a high speed, this non-uniformity in temperature distribution is quite apparent.

In order to solve this problem of uneven heating of the top panel of a cap shell associated with prior art apparatus, it has been proposed to heat cap shells between the lining material dispensing station and the shell transfer station instead of heating the shell between the shell supply station and the lining material dispensing station. If this alternative method of heating is employed, a cap shell is not heated at the lining material dispensing station but is at a low temperature. Accordingly, when a plastic lining material is dispensed from an extruder into a predetermined position on the inner surface of the top panel of a cap shell, the lining material is displaced with respect to the cap shell by inertia and cannot be properly held in position on the inner surface of the top panel thus posing a further problem. In addition, the conveying passage between the lining material dispensing station and the cap shell transfer station must be made longer than is necessary in order to heat the cap shell to a desired high temperature sufficiently and uniformly.

It is therefore an object of this invention to provide an an apparatus for dispensing and molding lining material into metallic cap shells where the molded lining material will be securely bonded to the inner surfaces of the cap shells with sufficient bond strengths while overcoming the problems mentioned above.

DESCRIPTION OF THE INVENTION

We have found that in order to adjust both the temperature of a cap shell during the dispensing of lining material and also the temperature of the cap shell during molding of the lining material, it is important that the cap shell being conveyed by the conveyor mechanism should be heated not only between the cap shell supply station and the lining material dispensing station, but also between the lining material dispensing station and the cap shell transfer station (i.e. until the cap shell is transferred into the molding mechanism after conveyance from the lining material dispensing station. In addition we have found that although heaters of various constructions including hot air heaters may be used to heat the cap shells, the use of a high frequency induction heater utilizing a high frequency induction current is important in order to sufficiently heat cap shells being conveyed at high speeds during a relatively short period.

As described in the specification and drawings of our co-pending U.S. application Ser. No. 039,122 filed May 15, 1979 when cap shells made of a non-magnetic material such as an aluminum base alloy are heated by high frequency induction by providing a heating coil extending along a conveying passage for the cap shells, the cap shells will rise and jump up because of the repulsive action between the magnetic field formed by the induction current generated in the cap shells and the magnetic field formed by the high frequency current flowing through the heating coil. The result is that the caps are not heated and are not conveyed. However as disclosed in that application, the cap shells can be heated as required without hampering the movement of the cap shells if a high frequency induction heater is used equipped with a guide plate for preventing the rising and jumping of cap shells. The guide plate extends along the shell conveying passage and also extends along the skirt edges of the cap shells being conveyed as previously suggested and disclosed in application Ser. No. 039,122.

According to this invention there is provided generally an apparatus for dispensing a lining material and molding it into metallic cap shells where the apparatus comprises a conveyor mechanism for conveying cap shells at a predetermined speed through a predetermined passage extending from a cap shell supply station to a cap shell transfer station and passing through a lining dispensing station. A supply mechanism for supplying the cap shells to the conveyor mechanism at the shell supply station, a lining material dispensing mechanism for dispensing a predetermined amount of lining material into the cap shells at the lining material dispensing station and a molding mechansim for receivng the cap shells from the conveyor mechanism at the cap shell transfer station and for molding the lining material in the cap shells into a predetermined shape are also included in the apparatus. The improvement comprises in that the apparatus further includes a high frequency induction heater for heating the cap shells as they move between the shell supply station and the lining material dispensing station and also between the lining material dispensing station and the shell transfer station. The high frequency induction heater comprises a heating coil extending along the shell conveying passage between the shell supply station and the lining material dispensing station and between the lining material dispensing station and the shell transfer station for heating the top panels of the cap shells being conveyed through the conveying passage. A high frequency oscillator is included for supplying a high frequency current to the heating coil and a guide plate is included which extends along the shell conveying passage between the shell supply station and the lining material dispensing station and between the lining material dispensing station and the shell tranfer station. The guide plate also extends towards the skirt edges of the cap shells being conveyed through the conveying passage.

In one preferred embodiment of the invention, the guide plate is made of transparent heat resistant tempered glass. According to another embodiment of the invention, the heating coil has a pair of conductors which are spaced from each other at a distance smaller than the diameter of the top panel of each of the cap shells and in which the directions of the flow of current are opposite to each other. The coils extend a greater part of the distance between the shell supply station and the lining material dispensing station and a greater part of the distance between the lining material dispensing station and the shell transfer station.

BEST MODES FOR CARRYING OUT THE INVENTION

Figure 1:
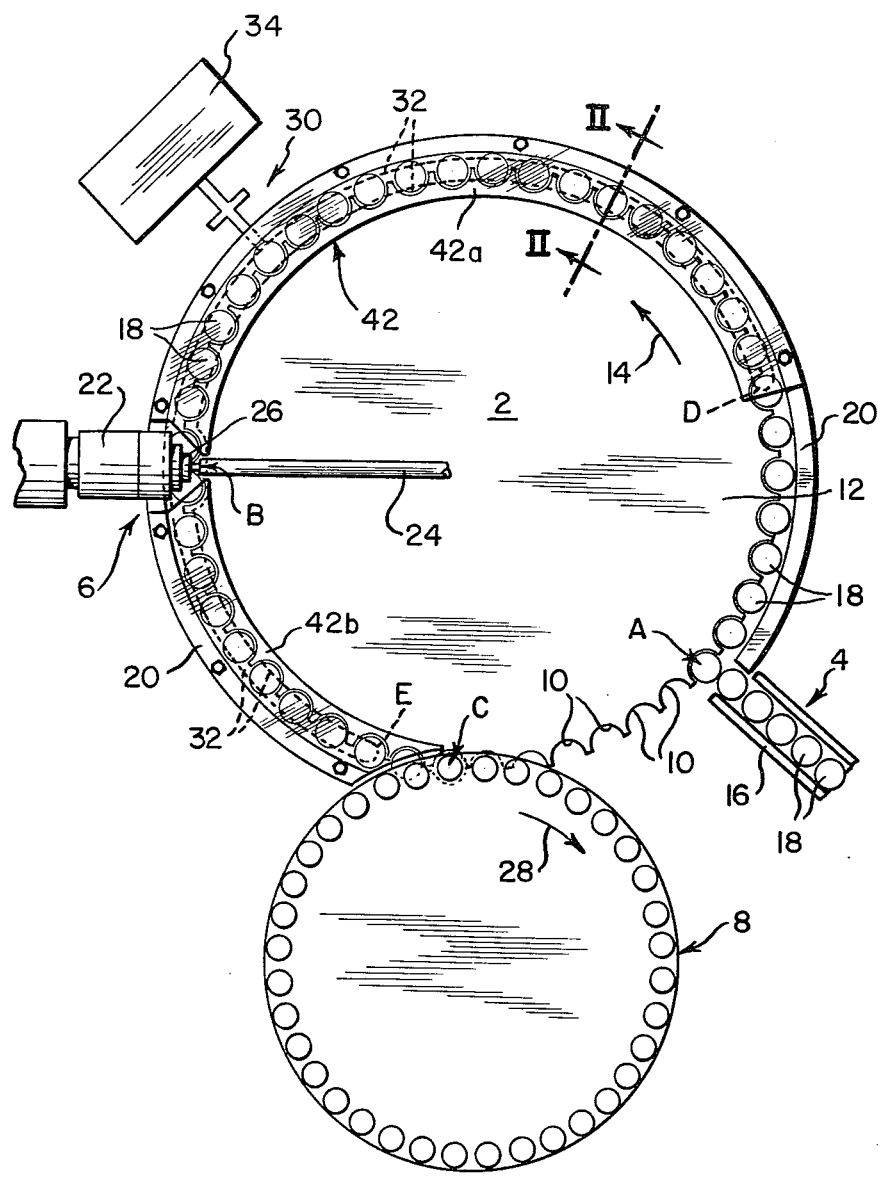
FIG. 1 is a schematic top plan view illustrating one embodiment of the apparatus of this invention.

Referring to FIG. 1, the apparatus as shown includes a conveyor mechanism 2 for conveying cap shells at predetermined speeds, a shell supply station A having a supply mechanism 4 for supplying cap shells to the conveyor mechanism 2, a lining material dispensing station B having a lining material dispensing mechanism 6 for dispensing a predetermined amount of lining material into the cap shells and a molding mechanism 8 for receiving the cap shells from the conveyor mechanism 2 and molding the lining material in the cap shells into a predetermined shape.

Figure 2:
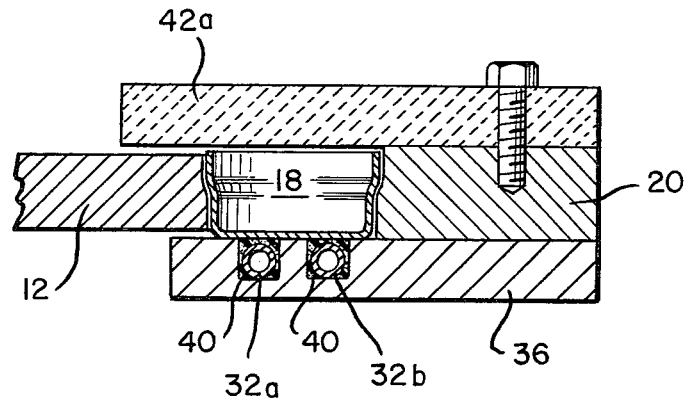
FIG. 2 is an enlarged sectional view taken along the line II—II of FIG. 1.

The conveyor mechanism 2 is constructed of a rotatable disc 12 having a plurality of recesses 10 of a substantially semi-circular shape formed at its peripheral edge. The rotatable disc 12 is drivingly connected to a drive source (not shown) and is adapted to be rotated continuously in the direction shown by arrow 14. The supply mechanism 4 has a feed chute 16 extending to approximately the peripheral edge portion of the rotatable disc 12, and supplies cap shells 18 successively to the recesses 10 of the rotatable disc 12 at cap shell supply station A. The cap shells are fed upside down with their top panels facing downwardly and their skirts extending upwardly as shown in FIG. 2. An arcuate guide wall 20 is disposed around the disc 12 and extends exteriorly of the disc 12 in the radial direction for a predetermined distance. A suitable supporting plate (not shown) is disposed beneath the peripheral edge of the rotatable disc 12 except in those areas in which a heater is positioned. A cap shell 18 supplied to a recess 10 of the rotating disc 12 by the supply mechanism 4 is held therein while its top panel is located on the supporting plate and its side surface is restricted by the guide wall 20. In this manner, cap shells 18 are conveyed at a predetermined speed as the disc 12 rotates.

The lining material dispensing mechanism 6 dispenses a predetermined amount of lining material at the dispensing station B into the inside of each of the cap shells 18 conveyed by the conveyor mechanism 2, more specifically into a predetermined position inwardly of the top panel of the cap shell 18. The dispensing mechanism 6 may comprise, for example, an extruder 22 having an opening above the dispensing station B and adapted to heat-soften a lining material which may be a suitable synthetic resin, for example a polyolefin resin such as polyethylene or polypropylene or a vinyl chloride resin. The softened lining material is then extruded from the extrusion opening and a rotatable cutting blade 26 which is supported on a rotatable shaft 24 operated by a drive source (not shown) is adapted to be rotated across the extrusion opening so as to cut the lining material and carry it to the inside of a cap shell 18.

The molding mechanism 8 may comprise a rotary molding device which is rotated in the direction of arrow 28 by a suitable drive source, and during this rotation, receives a cap shell 18 from the conveyor mechanism 2 at the cap shell transfer station C and molds the lining material within the cap shell 18 into a predetermined shape.

The conveyor mechanism 2, the supply mechanism 4, the lining material dispensing mechanism 6 and the molding mechanism 8 described above do not constitute any novel feature of the apparatus in accordance with this invention and may be similar to those mechanisms which are used in the apparatus disclosed, for example, in the specifications and drawings of Japanese Patent Publication No. 20759/67, Japanese Laid-Open Patent Publication No. 99186/77 and Japanese Patent Application No. 82888/78. Accordingly, a detailed description of the structures, operations and results of these mechanisms is omitted in the present application while reference may be made to the above cited prior patent documents for details.

In the aforesaid apparatus, the temperature of the cap shell 18 at the lining material dispensing station B and the temperature of the cap shell 18 after it has been transferred to the molding mechanism 8 are important and should be adjusted to certain predetermined values in order to dispense lining material accurately into a predetermined position inwardly of the top panel of a cap shell and also to bond the molded lining material firmly to the inside of the top panel of a cap shell 18. These temperatures differ somewhat depending upon the type of the material comprising the cap shell 18 and of the lining material. For example, when the cap shell 18 is made of an aluminum base alloy and coated on its inside surface with an adhesive primer composed of an epoxy-phenol type paint and oxidized polyethylene or maleinized polyethylene dispersed therein (for such an adhesive primer, see Japanese Patent Publications Nos. 9632/79 and 11836/79) and the lining material is a polyolefin resin such as polyethylene or polypropylene, the temperature of the cap shell 18 at the lining material dispensing position B is preferably about 120° to 210° C. and more particularly about 140° to about 160° C., and the temperature of the cap shell 18 after it has been transferred to the molding mechanism 8 is preferably about 110° to about 200° C. and more particularly about 120° to about 150° C.

In view of this fact, the apparatus according to this invention further includes a high frequency induction heater of a unique structure shown generally at 30 for heating the cap shells 18 not only between the cap shell supply station A and the lining material dispensing station B but also between the dispensing station B and the shell transfer station C.

Referring to FIG. 2 taken in conjunction with FIG. 1, the high frequency induction heater 30 includes a heating coil 32 and a high frequency oscillator 34 for supplying a high frequency current to the heating coil 32. In the illustrated embodiment, the heating coil 32 extends from a position D to a position E in FIG. 1 beneath the peripheral edge of the rotatable disc 12 except in the vicinity of the dispensing station B. Thus, the heating coil 32 extends along a conveyor passage for the cap shells 18 to be conveyed by the conveyor mechanism 2 and faces towards the top panels of the cap shells 18 being conveyed through this passage. In order to heat the cap shells 18 effectively by high frequency induction, the heating coil 32 preferably has a pair of conductors 32a and 32b which are spaced from each other at a distance smaller than the diameter of the top panel of each cap shell 18 and in which the directions of the flow of current are opposite to each other. Preferably, the heating coil 32 is constructed of a hollow member so that it may be cooled by circulating a cooling fluid such as water through its inner space.

It is important that the heating coil 32 be disposed as close as possible to the top panels of the cap shells 18 to provide effective heating of the cap shells. Thus the heating coil 32 is preferably disposed in position by forming a groove in the top surface of an arcuate heating coil supporting plate 36 made of a highly magnetically permeable insulating material such as ferrite or an insulating plastic material such as bakelite, placing the heating coil 32 in the groove, cementing it by an adhesive 40 such as an epoxy resin adhesive and fixing the outer peripheral edge of the top surface of the supporting plate 36 to the lower surface of the guide wall 20.

The high frequency oscillator 34 may be of any desired shape and high frequency oscillators of the vacuum tube type or transistor type well known to those skilled in the art may be used.

When a high frequency current is supplied from the high frequency oscillator 34 to the heating coil 32 in the above-described heater 30, an induced current is generated in the cap shells 18 and thus the cap shells 18 are heated by the Joule's heat effect. However, as described and shown in the specifications and drawings of U.S. application Ser. No. 039,122, particularly when the cap shell is made of a non-magnetic material such as an aluminum base alloy, the cap shell is raised and jumps up due to the repulsive action between a magnetic field generated by the induced current in the cap shell 18 and a magnetic field generated by the high frequency current flowing through the heating coil 32. The result is that the cap is not heated sufficiently and the cap will not be conveyed. In order to prevent this occurrence the high frequency induction heater 30 used in the apparatus of this invention further includes a guide plate 42 for preventing the rising and jumping of the cap shells 18. It is important that the guide plate 42 should extend within an area where the high frequency current flowing through the heating coil 32 acts on the cap shell 18, i.e. from the vicinity of the point D to the vicinity of the point E shown in FIG. 1 (excepting the vicinity of the lining material dispensing station) along the conveyor passage of the cap shell 18. The guide plate 42 should also extend towards and over the edge of the skirt of each cap shell conveyed through the passage. In the illustrated embodiment, the outer peripheral portions of two arcuate guide plates 42a and 42b are fixed to the top surface of the guide wall 20 and the inner peripheral portions of these guide plates 42a and 42b extend along the conveyor passage of the cap shells 18 and also extend toward and over the edges of the skirts of the cap shells 18 being conveyed through this passage. The guide plates 42a and 42b contact the edges of the skirts of the cap shells 18 to prevent their rising and jumping. Hence, the conveying of the cap shells 18 by the conveyor mechanism 2 can be ensured and the cap shells 18 can be heated as required by high frequency induction.

The guide plates 42a and 42b can be made of a suitable material. The lower surfaces of these guide plates, however, should be sufficiently smooth in view of the fact that the end edges of the skirts of the cap shells 18 slide with respect to the guide plates 42a and 42b while being in engagement with the lower surfaces of these guide plates. Preferably, therefore, the guide plates 42a and 42b are made of a ceramic material, especially a transparent heat-resistant tempered glass plate having a thickness of about 5 to 10 mm. If the guide plates 42a and 42b are made of a transparent glass plate, the cap shells 18 can be inspected while passing through the apparatus.

Figure 3A:
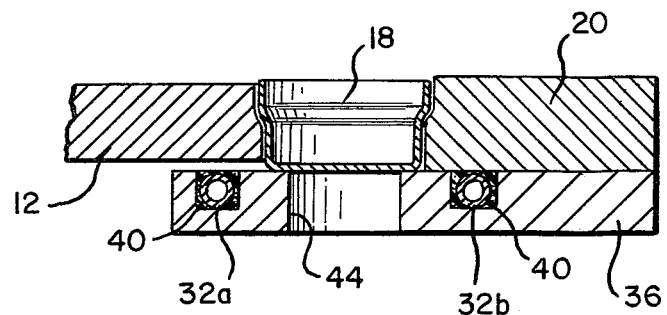
FIGS. 3-A, 3-B and 3-C are enlarged sectional views illustrating various forms of a heating coil and a heating coil supporting plate at a lining material dispensing station.
Figure 3B:
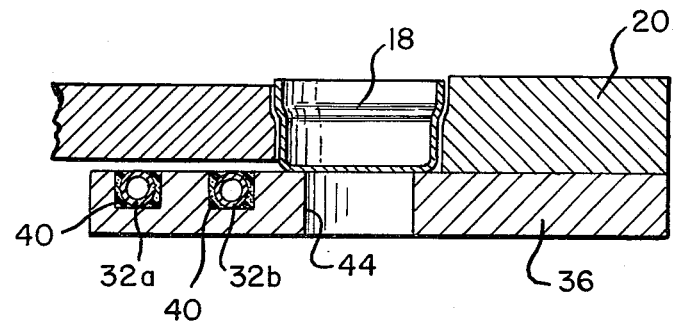
Figure 3C:
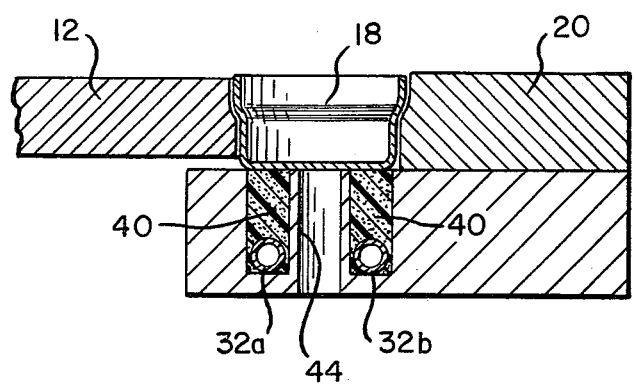

At the lining material dispensing station B, it is necessary to dispense lining material into the cap shells 18. Accordingly, the insides of the cap shells 18 need to be opened upwardly without being covered with the guide plates 42a and 42b. for this reason, in the illustrated embodiment, the end portion of the guide plate 42a and the end portion of the guide plate 42b are spaced from each other a predetermined distance at the dispensing station B and the inside of each cap shell 18 is opened upwardly at the dispensing station B through a space between the guide plates 42a and 42b. Since the high frequency current flowing through the heating coil 32 would tend to make the cap shell 18 at the dispensing station B rise and jump, it becomes necessary to provide a means of preventing the high frequency current flowing through the heating coil 32 from acting on the cap shell 18 at the station B. This can be accomplished, for example, by positioning the conductors 32a and 32b of the heating coil 32 at the dispensing station B such that they extend on opposite sides of the path of the cap shells 18 as shown in FIG. 1 and FIG. 3A or the conductors may be positioned such that they extend on one side of the path of the cap shells 18 as shown in FIG. 3B. Still further the conductors may be positioned to run beneath the path of the cap shells 18 but at positions spaced a sufficient distance therefrom as shown in FIG. 3C whereby any induced current in the shells is minimized.

If no cap shell 18 is present in the recess 10 of the disc 12 at the lining material dispensing station B during the operation of the cutting blade 26 of the dispensing mechanism 6, the lining material dispensed by the action of the blade 26 will accumulate on the heating coil supporting plate 36 and thus hamper future conveying of the cap shells. In order to avoid this, it is preferred to provide a hole 44 extending through the coil supporting plate 36 so that in the absence of a cap shell in the recess 10 of the rotating disc 12, lining material dispensed by the action of the cutting blade 26 will drop below the coil supporting plate 36 through the hole 44 where it is collected in a suitable receptacle (not shown).

In the illustrated embodiment, the guide plate 42 is constructed of two guide plate members 42a and 42b, but if desired, it may be constructed of three or more guide plate members or it may even comprise a single guide plate having an opening or recess at the lining material dispensing station B. Alternatively, the guide plate 42 may be mounted for free movement in the perpendicular direction and a spring means for biasing the guide plate 42 downwardly may be provided to press it elastically against the end edge of the skirts of the cap shells.

The high frequency induction heater 30 described above performs effective induction heating of the cap shell during its conveyance from the cap shell supply station to the lining material dispensing station B by the conveyor mechanism 2. As a result, the temperature of the cap shell 18 at the lining material dispensing station B can be adjusted to a desired point, for example about 150° C. The cap shell 18 can also be effectively heated by induction by means of the heater 30 while it is being conveyed from the dispensing station B to the cap shell transfer station C. When the cap shell 18 is transferred into the molding mechanism 8, its temperature decreases slightly as a result of its contact with an anvil (not shown). However if the cap shell 18 is heated by induction during its conveyance from the lining material dispensing station B to the cap shell transfer station C, the temperature of the cap shell which has been transferred into the molding mechanism 8 can be maintained at a desired point, for example about 125° C.

EXAMPLE

Ten cap shells having a top panel inside diameter of 38 mm and a height of 18 mm were made from an aluminum base alloy sheet having a thickness of 0.25 mm. The inside surfaces of these cap shells were coated with an adhesive primer composed of an epoxyphenol-type paint and oxidized polyethylene dispersed therein, followed by baking.

These cap shells were processed by an apparatus of the type shown in FIGS. 1, 2 and 3A. Seven hundred (700) mg of a lining material comprising molten polyethylene was dispensed into each of the cap shells and molded. The diameter of the cap shell conveyor passage of the disc in the apparatus used was 750 mm and the speed of the cap shell conveyance was 70 cm/sec. The time required to convey the cap shell from the cap shell supply station A to the lining material dispensing station B was 1.4 seconds and the time required to covey it from the dispensing station B to the cap shell transfer station C was 0.6 second. A transistor-operated high frequency oscillator was used in the high frequency induction heater ad a high frequency current of 1.8 A at 6 KV was supplied to the heating coil at a frequency of 25 $KH_z$. The temperature of the cap shell at the lining material dispensing station B was found to be about 150° C.

The bond strength between the molded lining material and the cap shell in the cap shell processed under the above conditions was as shown in Table 1 below. The bond strength is expressed as the force required to separate the lining material from the cap shell.

Comparative Example

For comparison ten cap shells of the same material and structure as in the Example were processed under the same conditions as in the Example except that no heating coil was provided between the lining material dispensing station B and the cap shell transfer station C and, therefore, the cap shells were not heated between these two stations.

The bond strength between the molded lining material and the cap shell, as the force required to separate the lining material from the cap shell, was as shown in Table 1.

TABLE 1

|  | Maximum strength (g) | Minimum strength (g) | Average strength of the 10 cap shells (g) |
|---|---|---|---|
| Example | 5000 | 4000 | 4640 |
| Comparative Example | 2990 | 1700 | 2429 |

We claim:

1. An apparatus for dispensing and molding a lining material into metallic cap shells where said apparatus has a conveyor mechanism for conveying cap shells at a predetermined speed through a conveyor passage extending from a cap shell supply station through a lining material dispensing station and onto a cap shell transfer station, a supply mechanism for supplying cap shells to said conveyor mechanism at the shell supply station, a lining material dispensing mechanism for dispensing a predetermined amount of lining material into the cap shells at the lining material dispensing station, and a molding mechanism for receiving the cap shells from said conveyor mechanism at the cap shell transfer station and for molding the lining material in the cap shells into a predetermined shape; the improvement comprising in having a high frequency induction heater for heating cap shells conveyed between said shell supply station and said lining material dispensing station and conveyed between said lining material dispensing station and said shell transfer station, said high frequency induction heater comprising a heating coil extending along the conveyor passage between said shell supply station and said lining material dispensing station and between said lining material dispensing station and said shell transfer station with the coil facing toward the top panels of the cap shells being conveyed through said conveyor passage, in that said coil is positioned further from said conveyor passage at said lining material dispensing station than from said conveyor passage extending between said shell supply station and said liner material dispensing station and from said conveyor passage extending between said liner material dispensing station and said shell transfer station, in having a high frequency oscillator for supplying a high frequency current to said heating coil, in having a guide plate extending along said conveyor passage between said shell supply station and said lining material dispensing station and between said lining material dispensing station and said shell transfer station and extending over and towards skirt edges of cap shells being conveyed through said conveyor passage and in that there is a gap in said guide plate at said liner material dispensing station.

2. The apparatus of claim 1 the improvement further comprising in that said guide plate is made of transparent heat-resistant tempered glass.

3. The apparatus of claim 1 the improvement further comprising in that said heating coil has a pair of conductors which are spaced from each other at a distance smaller than the diameter of the top panel of each of said cap shells and in which the directions of the flow of current are opposite to each other.

* * * * *